United States Patent
Lee et al.

(10) Patent No.: US 11,728,480 B2
(45) Date of Patent: Aug. 15, 2023

(54) POSITIVE ELECTRODE FOR SECONDARY BATTERY AND LITHIUM SECONDARY BATTERY INCLUDING THE SAME

(71) Applicant: LG Chem, Ltd., Seoul (KR)

(72) Inventors: Kyung Min Lee, Daejeon (KR); Jung Seok Choi, Daejeon (KR); Kyung Min Kim, Daejeon (KR); Song Taek Oh, Daejeon (KR)

(73) Assignee: LG Energy Solution, Ltd.

( * ) Notice: Subject to any disclaimer, the term of this patent is extended or adjusted under 35 U.S.C. 154(b) by 191 days.

(21) Appl. No.: 16/475,472

(22) PCT Filed: Jul. 16, 2018

(86) PCT No.: PCT/KR2018/008043
§ 371 (c)(1),
(2) Date: Jul. 2, 2019

(87) PCT Pub. No.: WO2019/022423
PCT Pub. Date: Jan. 31, 2019

(65) Prior Publication Data
US 2020/0295362 A1    Sep. 17, 2020

(30) Foreign Application Priority Data

Jul. 28, 2017    (KR) ......................... 10-2017-0096436

(51) Int. Cl.
*H01M 4/505* (2010.01)
*H01M 4/04* (2006.01)
(Continued)

(52) U.S. Cl.
CPC ......... *H01M 4/505* (2013.01); *H01M 4/0404* (2013.01); *H01M 4/366* (2013.01);
(Continued)

(58) Field of Classification Search
CPC .... H01M 4/0404; H01M 4/366; H01M 4/485; H01M 4/525; H01M 4/62;
(Continued)

(56) References Cited

U.S. PATENT DOCUMENTS 6,440,605 B1    8/2002  Kise et al.
2001/0036575 A1    11/2001  Kise et al.
(Continued)

FOREIGN PATENT DOCUMENTS

CN    101471435 A    7/2009
CN    103107338 A    5/2013
(Continued)

OTHER PUBLICATIONS

EPO machine translation of WO2009117869 originally published to You Shengping on Oct. 1, 2009 (Year: 2009).*

(Continued)

*Primary Examiner* — Cynthia H Kelly
*Assistant Examiner* — Niara Trant
(74) *Attorney, Agent, or Firm* — Lerner David LLP

(57) ABSTRACT

The present invention relates to a positive electrode for a secondary battery to improve stability during overcharge, and a lithium secondary battery including the same, and particularly, to a positive electrode for a secondary battery including a positive electrode active material layer formed on a positive electrode collector, wherein the positive electrode active material layer has a double-layer structure which includes a first positive electrode active material layer formed on the positive electrode collector and a second positive electrode active material layer formed on the first positive electrode active material layer, the first positive electrode active material layer includes a first positive electrode active material, a conductive agent, and a volume expansion resin in which volume expansion occurs at a high (Continued)

temperature during overcharge, and the second positive electrode active material layer includes a second positive electrode active material, and a lithium secondary battery including the same.

7 Claims, 1 Drawing Sheet

(51) Int. Cl.
    *H01M 4/36*       (2006.01)
    *H01M 4/485*     (2010.01)
    *H01M 4/525*     (2010.01)
    *H01M 4/62*       (2006.01)
    *H01M 10/0525*   (2010.01)
    *H01M 4/02*       (2006.01)

(52) U.S. Cl.
    CPC .......... *H01M 4/485* (2013.01); *H01M 4/525* (2013.01); *H01M 4/62* (2013.01); *H01M 10/0525* (2013.01); *H01M 2004/028* (2013.01)

(58) Field of Classification Search
    CPC ... H01M 10/05–525; H01M 2004/028; H01M 4/02–525
    See application file for complete search history.

(56) References Cited

U.S. PATENT DOCUMENTS

| | | | |
|---|---|---|---|
| 2001/0049050 A1* | 12/2001 | Aragane | H01M 4/13 429/62 |
| 2006/0019151 A1 | 1/2006 | Imachi et al. | |
| 2008/0241684 A1 | 10/2008 | Muraoka et al. | |
| 2012/0141875 A1* | 6/2012 | Watanabe | H01M 10/052 429/220 |
| 2013/0089780 A1 | 4/2013 | Uezono | |
| 2013/0130075 A1 | 5/2013 | Kim et al. | |
| 2017/0092943 A1 | 3/2017 | Li et al. | |
| 2019/0198864 A1* | 6/2019 | Chang | H01M 4/131 |

FOREIGN PATENT DOCUMENTS

| | | |
|---|---|---|
| EP | 2787563 A1 | 10/2014 |
| EP | 3032619 A1 | 6/2016 |
| EP | 3534437 A1 | 9/2019 |
| JP | 2000077061 A | 3/2000 |
| JP | 2001338639 A | 12/2001 |
| JP | 2004030998 A | 1/2004 |
| JP | 2006134770 A | 5/2006 |
| JP | 2007026676 A | 2/2007 |
| JP | 2007048744 A | 2/2007 |
| JP | 2008243708 A | 10/2008 |
| JP | 4394857 B2 | 1/2010 |
| JP | 2013254692 A | 12/2013 |
| JP | 2014505335 A | 2/2014 |
| JP | 2015015182 A | 1/2015 |
| JP | 2015088370 A | 5/2015 |
| JP | 2015216007 A | 12/2015 |
| JP | 2016076439 A | 5/2016 |
| JP | 2017063027 A | 3/2017 |
| KR | 20010020338 A | 3/2001 |
| KR | 20030042387 A | 5/2003 |
| KR | 20070023293 A | 2/2007 |
| KR | 20070094147 A | 9/2007 |
| KR | 20090119447 A | 11/2009 |
| KR | 20130123492 A | 11/2013 |
| KR | 101610924 B1 | 4/2016 |
| WO | 99067837 A1 | 12/1999 |
| WO | 2006132474 A1 | 12/2006 |
| WO | 2009117869 A1 | 10/2009 |
| WO | 2017126510 A1 | 7/2017 |

OTHER PUBLICATIONS

Extended European Search Report including the Written Opinion for Application No. EP 18838621.3 dated Feb. 12, 2020, 9 pages.
International Search Report for Application PCT/KR2018/008043 dated Oct. 15, 2018.
Search Report for Chinese Application No. 201880005560.2 dated Sep. 14, 2021. 2 pgs.

* cited by examiner

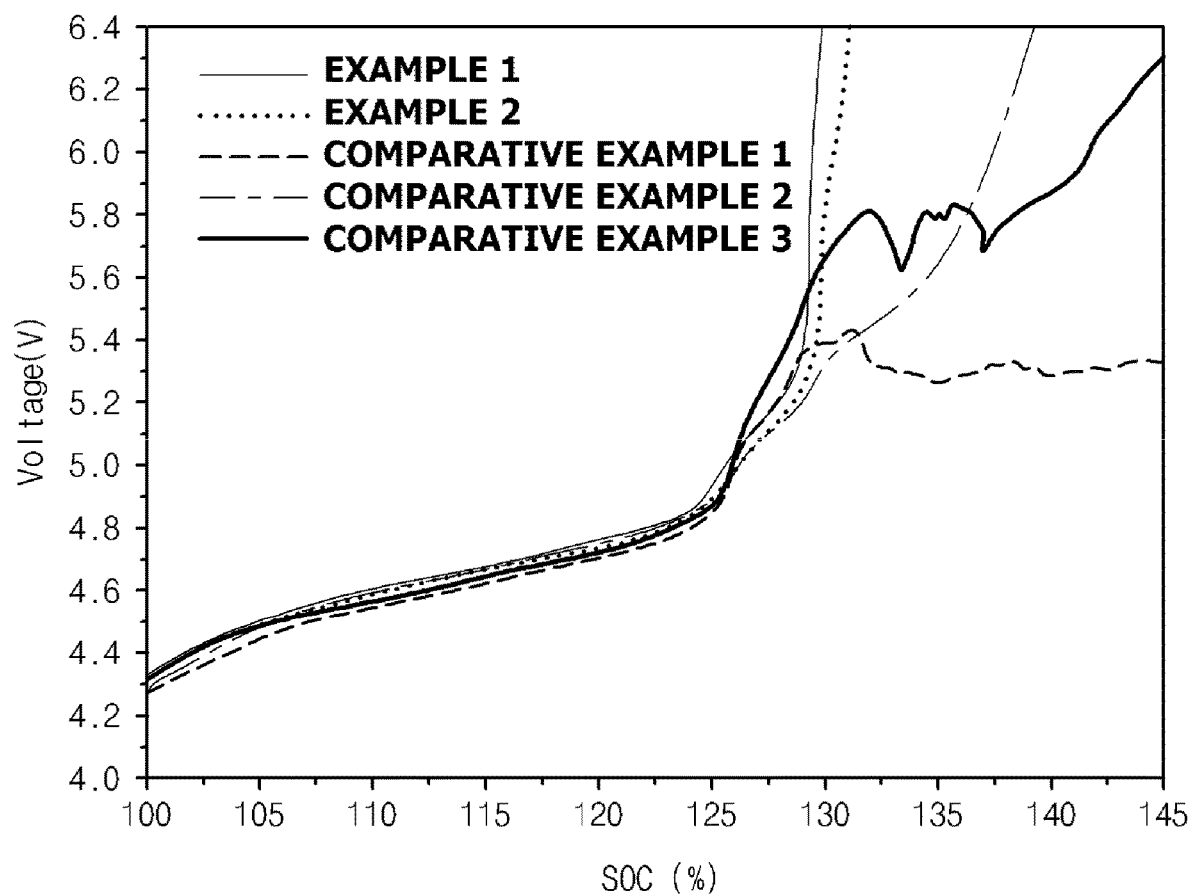

POSITIVE ELECTRODE FOR SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2018/008043, filed Jul. 16, 2018, which claims the priority to Korean Patent Application No. 10-2017-0096436, filed Jul. 28, 2017, the disclosures of which are incorporated herein by reference.

TECHNICAL FIELD

The present invention relates to a positive electrode for a secondary battery, and a lithium secondary battery including the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Recently, there is an increasing demand for high-capacity, high energy density, and low-cost lithium secondary batteries as the lithium secondary batteries have been used as a power source of a medium and large-sized device such as an electric vehicle, and, accordingly, studies for using low-cost nickel (Ni), manganese (Mn), or iron (Fe) in replacement of expensive cobalt (Co) have been actively carried out.

One of major research projects of the lithium secondary battery is to improve stability of the battery using a high-capacity and high-output electrode active material while realizing the same.

Currently, lithium secondary batteries are designed for use in a specific voltage range (typically, 4.4 V or less) to ensure durability and stability. However, a cell potential may unintentionally rise above the range, wherein the sudden rise in the cell potential causes delithiation of a positive electrode material to generate a large amount of tetravalent Co and Ni ions, a side reaction, such as generation of gas or oxidation of an electrolyte solution, accordingly occurs, and this results in degrading the performance of the cell.

Also, if the overcharged state exceeding the allowable current or voltage is continued, it may cause serious problems in stability, for example, the cell may explode or ignite. Particularly, a lithium secondary battery used in a medium and large-sized battery pack, as a power source of electric vehicles and hybrid vehicles, is required to have a long lifetime, and, at the same time, it is more important to secure the stability because of the characteristics that a plurality of battery cells are densely packed.

With respect to a conventional secondary battery, a method of venting high-pressure internal gas at regular intervals or forming a passage through which gas may be discharged has been adopted to prevent a swelling phenomenon of the battery due to high temperature and high pressure in the battery or the resulting explosion of the battery.

However, this method is merely to check the state of the battery periodically, and the stability of the battery may not be sufficiently secured.

Therefore, there is a need to develop a battery which escapes from the risk of ignition or explosion due to the generation of gas when the battery is overcharged and is improved in stability.

DISCLOSURE OF THE INVENTION

Technical Problem

An aspect of the present invention provides a positive electrode for a lithium secondary battery which may secure stability of the battery by interrupting a charge current during overcharge in order to prevent ignition or explosion during the overcharge.

Another aspect of the present invention provides a lithium secondary battery including the positive electrode for a lithium secondary battery.

Technical Solution

According to an aspect of the present invention, there is provided a positive electrode for a secondary battery including a positive electrode active material layer formed on a positive electrode collector, wherein the positive electrode active material layer has a double-layer structure which includes a first positive electrode active material layer formed on the positive electrode collector and a second positive electrode active material layer formed on the first positive electrode active material layer, the first positive electrode active material layer includes a first positive electrode active material, a conductive agent, and a volume expansion resin in which volume expansion occurs at a high temperature during overcharge, and the second positive electrode active material layer includes a second positive electrode active material.

According to another aspect of the present invention, there is provided a lithium secondary battery including the positive electrode for a lithium secondary battery, a negative electrode, and a separator disposed between the positive electrode and the negative electrode.

Advantageous Effects

Since a positive electrode according to the present invention includes a volume expansion resin, in which volume expansion occurs at a high temperature during overcharge, in a first positive electrode active material layer of a double-layer structured positive electrode active material layer, the first positive electrode active material layer acts as an insulating layer due to melting and expansion of the volume expansion resin at a high temperature during overcharge and a charge current is accordingly interrupted to terminate the overcharge. Thus, stability of a battery may be improved.

With respect to a conventional positive electrode composed of a single-layered positive electrode active material layer, there was a limitation in that the application of a high-capacity positive electrode active material with relatively low stability was limited, but, in the present invention, since stability problems do not occur even if the high-capacity positive electrode active material is applied to an upper positive electrode active material layer, a secondary battery having energy density higher than a conventional battery may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating results of an overcharge test of lithium secondary batteries prepared in Examples 1 and 2 and Comparative Examples 1 to 3 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode for a secondary battery according to an embodiment of the present invention is:

a positive electrode including a positive electrode active material layer formed on a positive electrode collector, wherein the positive electrode active material layer has a double-layer structure which includes a first positive electrode active material layer formed on the positive electrode collector and a second positive electrode active material layer formed on the first positive electrode active material layer, the first positive electrode active material layer includes a first positive electrode active material, a conductive agent, and a volume expansion resin in which volume expansion occurs at a high temperature during overcharge, and the second positive electrode active material layer includes a second positive electrode active material.

Hereinafter, the positive electrode for a secondary battery according to the present invention will be described in more detail.

First, the positive electrode includes a double-layer structured positive electrode active material layer formed on a positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer has a double-layer structure which includes a first positive electrode active material layer formed on the positive electrode collector and a second positive electrode active material layer formed on the first positive electrode active material layer.

Since the double-layer structured positive electrode active material layer is used as described above, application of a high-capacity positive electrode active material, which has not been applied due to stability problems when a single-layer structured positive electrode active material layer is used, is possible, and, accordingly, energy density of a secondary battery may be increased.

For example, in a case in which a conventional single-layer structured positive electrode active material layer is used, since continuous charge may occur even during overcharge, swelling, ignition, or explosion may occur. Also, in a case in which stability is improved by adding a volume expansion resin to the single-layer structured positive electrode active material layer, a large amount of the volume expansion resin is required and, thus, the energy density of the secondary battery including the same may be reduced. In contrast, in the present invention, since the volume expansion resin is only added to a lower layer of the double-layer structured positive electrode active material layer, a conductive path of a conductive agent is blocked by melting and expansion of the volume expansion resin due to an increase in temperature of the battery at high temperatures during overcharge, and thus, the lower layer may act as an insulating layer to terminate the overcharge by interrupting a charge current. Accordingly, stability of the battery may be improved while minimizing the reduction of the energy density.

The first positive electrode active material layer may include a first positive electrode active material, a conductive agent, and a volume expansion resin in which volume expansion occurs at a high temperature during overcharge.

The first positive electrode active material layer may include a first positive electrode active material having a structurally stable olivine structure. Specifically, the first positive electrode active material layer may include an olivine-structured first positive electrode active material represented by Formula 1 below.

 [Formula 1]

In Formula 1,

M is at least one element selected from the group consisting of aluminum (Al), magnesium (Mg), nickel (Ni), cobalt (Co), manganese (Mn), titanium (Ti), gallium (Ga), copper (Cu), vanadium (V), niobium (Nb), zirconium (Zr), cerium (Ce), indium (In), zinc (Zn), and yttrium (Y), X is at least one element selected from the group consisting of fluorine (F), sulfur (S), and nitrogen (N), −0.5≤a1≤0.5, 0≤x1≤0.5, and 0≤y1≤0.3.

The first positive electrode active material may be included in an amount of 9.9 wt % to 89.9 wt %, for example, 30 wt % to 70 wt % based on a total weight of the first positive electrode active material layer.

The volume expansion resin in which volume expansion occurs at a high temperature during overcharge, which is included in the first positive electrode active material layer according to the present invention, is a polymer having an onset point of 60° C. to 70° C. and a melting point of 180° C. or less, preferably 50° C. to 180° C., and more preferably 80° C. to 120° C. For example, the volume expansion resin may include at least one selected from the group consisting of polyethylene, polypropylene, and poly(ethylene-vinyl acetate), but the present invention is not limited thereto. In this case, the expression "onset point" denotes a melting initiation temperature of the resin in which volume expansion occurs.

The overcharge voltage may be 4.5 volt or more, preferably 4.8 V or more, and more preferably 5 V or more.

For example, the volume expansion resin exists in a crystalline state at a use temperature (60° C. or less) of a typical battery. However, when the battery is overcharged at about 4.5 V or more, a temperature of the volume expansion resin is also gradually increased as the temperature of the battery is increased. When the temperature of the volume expansion resin is increased above the onset point of the volume expansion resin, the volume expansion resin melts and expands to block the conductive path of the conductive agent included in the first positive electrode active material layer. Accordingly, the first positive electrode active material layer acts as an insulating layer to increase resistance, and the charge current is interrupted to reach an overcharge end voltage.

Particularly, in a case in which the volume expansion resin and the olivine-structured first positive electrode active material are used together, a volumetric shrinkage of the olivine-structured first positive electrode active material occurs due to delithiation of the first positive electrode active material above the overcharge voltage, and, accordingly, the conductive path of the conductive agent included in the first positive electrode active material layer is more quickly blocked to generate synergistic effects thereof. Accordingly, time for reaching the overcharge end voltage may be further accelerated. The volume expansion resin may be included in an amount of 10 wt % to 90 wt %, for example, 30 wt % to 70 wt % based on the total weight of the first positive electrode active material layer. For example, in a case in which the volume expansion resin is included in an amount of less than 10 wt % based on the total weight of the first positive electrode active material layer, the blockage of the conductive path of the conductive agent included in the first positive electrode active material layer due to the melting and expansion of the volume expansion resin during the overcharge is delayed. Thus, the stability of the battery including the positive electrode may be deteriorated. In contrast, in a case in which the volume expansion resin is included in an amount of greater than 90 wt % based on the total weight of the first positive electrode active material layer, since the amount of the first positive electrode active material is relatively decreased, the energy density is reduced and a synergistic effect of charge termination due to the volume change may be reduced.

The conductive agent, for example, may be coated on a surface of the first positive electrode active material. Electrons may move between the positive electrode collector and the second positive electrode active material layer by the conductive agent included in the first positive electrode active material layer.

Any conductive agent may be used as the conductive agent without particular limitation as long as it has electron conductivity without causing adverse chemical changes. Examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and at least one thereof may be included.

The conductive agent may be included in an amount of 0.1 wt % to 60 wt %, preferably 1 wt % to 40 wt %, and more preferably 5 wt % to 20 wt % based on the total weight of the first positive electrode active material layer. In a case in which the conductive agent is included in the first positive electrode active material layer in an amount of 0.1 wt % to 60 wt %, an effect of reducing resistance of the secondary battery including the same may be achieved.

The first positive electrode active material layer may exhibit sufficient adhesion such that the adhesion between first positive electrode active material particles and/or the adhesion between the first positive electrode active material and the current collector by the volume expansion resin may form the positive electrode active material layer, even if the first positive electrode active material layer does not further include a separate binder.

Also, the first positive electrode active material layer may further selectively include a thickener, if necessary.

The thickener appropriately controls viscosity of a composition for forming the first positive electrode active material layer, wherein the thickener may include a cellulose-based compound. For example, the cellulose-based compound may include at least one selected from the group consisting of carboxymethyl cellulose, hydroxymethyl cellulose, alcohol-soluble cellulose butyrate, cellulose acetate, cellulose acetate butyrate, cellulose butyrate, cyanoethyl cellulose, methyl cellulose, ethyl cellulose, hydroxyethyl cellulose, ethyl hydroxyethyl cellulose, nitrocellulose, carboxymethyl cellulose sodium, carboxymethyl cellulose ammonium, hydroxypropyl cellulose, and hydroxypropyl methylcellulose. The thickener may be included in an amount of 1 wt % to 30 wt % based on the total weight of the first positive electrode active material layer.

The first positive electrode active material layer may have a thickness of 30 μm or less, preferably 0.1 μm to 20 μm, and more preferably 1 μm to 10 μm. For example, in a case in which the thickness of the first positive electrode active material layer is greater than 30 μm, since the amount of the volume expansion resin included relative to the total amount of the positive electrode active material or capacity is increased and, accordingly, a total volume of the electrode is also increased, the energy density of the battery including the same may be reduced.

The double-layer structured positive electrode active material layer according to the present invention includes a second positive electrode active material layer formed on the first positive electrode active material layer, and the first positive electrode active material layer and the second positive electrode active material layer include the positive electrode active materials different from each other.

The second positive electrode active material layer includes a layer-structured second positive electrode active material represented by Formula 2 below.

$$Li_{1+x}(Ni_aCo_bM'_c)_{1-x}O_2 \qquad \text{[Formula 2]}$$

In Formula 2, M' is at least one element selected from the group consisting of Mn, Al, Ti, Ga, Cu, V, Nb, Zr, Ce, In, Zn, and Y, 0<a<1, 0<b<1, 0<c<1, and −0.1≤x≤0.2, preferably 0.3<a<1, 0.1≤b<1, 0.1≤c<1, and a+b+c=1, and more preferably 0.5≤a<1, 0.1≤b≤0.3, and 0.1≤c≤0.3.

For example, the layer-structured second positive electrode active material represented by Formula 2 may include at least one selected from the group consisting of $LiNi_{0.6}Co_{0.2}Mn_{0.2}O_2$, $LiNi_{0.5}Co_{0.2}Mn_{0.3}O_2$, $LiNi_{0.5}Co_{0.3}Mn_{0.2}O_2$, and $LiNi_{0.8}Co_{0.1}Mn_{0.1}O_2$, but the present invention is not limited thereto.

The second positive electrode active material may be included in an amount of 40 wt % to 98.9 wt %, for example, 60 wt % to 98.9 wt % based on a total weight of the second positive electrode active material layer.

A positive electrode with high-capacity characteristics may be prepared by using the layer-structured positive electrode active material with high-capacity characteristics as the second positive electrode active material layer. For example, in a case in which a layer-structured positive electrode active material layer with high-capacity characteristics is used alone, there may be a possibility of ignition or explosion due to its stability problem, and, in contrast, in a case in which an olivine-structured positive electrode active material layer is used alone, the energy density may be reduced. However, both stability and high-capacity effects may be achieved by using the olivine-structured positive electrode active material with excellent stability and the layer-structured positive electrode active material with high-capacity characteristics in appropriate amounts as in the present invention.

The second positive electrode active material layer may further selectively include a conductive agent and a binder, if necessary.

Any conductive agent may be used as the conductive agent included in the second positive electrode active material layer without particular limitation as long as it has electron conductivity without causing adverse chemical changes. Examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and at least one thereof may be included.

The conductive agent may be included in an amount of 0.1 wt % to 30 wt %, preferably 1 wt % to 20 wt %, and more preferably 1 wt % to 10 wt % based on the total weight of the second positive electrode active material layer. In a case in which the conductive agent is included in the second positive electrode active material layer in an amount of 0.1 wt % to 30 wt %, an effect of reducing resistance of the secondary battery including the same may be achieved.

The binder improves the adhesion between second positive electrode active material particles and the adhesion between the first positive electrode active material layer and the second positive electrode active material layer. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and at least one thereof may be included. The binder may be included in an amount of 1 wt % to 30 wt % based on the total weight of the second positive electrode active material layer.

A thickness of the second positive electrode active material layer is not particularly limited, and the second positive electrode active material layer may be formed by changing the thickness according to capacity of the secondary battery to be prepared.

Also, according to the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move.

Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be more preferably used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

40 parts by weight of a $LiFePO_4$ positive electrode active material, 10 parts by weight of carbon black as a conductive agent, 3 parts by weight of carboxymethyl cellulose (CMC), and 47 parts by weight of a polyethylene resin dispersion were mixed in distilled water to prepare a first positive electrode active material slurry.

Separately, 94 parts by weight of a $LiNi_{0.6}Mn_{0.2}Co_{0.2}O_2$ positive electrode active material, 3 parts by weight of carbon black as a conductive agent, and 3 parts by weight of PVdF as a binder, were mixed in a N-methylpyrrolidone (NMP) solvent to prepare a second positive electrode active material slurry.

A 20 μm thick water based Al-foil current collector was coated with the above-prepared first positive electrode active material slurry and then dried to form a 10 μm thick first positive electrode active material layer. Subsequently, the second positive electrode active material slurry was coated on the first positive electrode active material layer, dried, and then roll-pressed to prepare a positive electrode in which a second positive electrode active material layer was formed on the first positive electrode active material layer.

Artificial graphite as a negative electrode active material, a styrene-butadiene rubber (SBR) as a binder, and carbon black as a conductive agent, were mixed in a ratio of 92:4:4 (wt %) and added to distilled water as a solvent, to prepare a negative electrode slurry. A 20 μm thick Cu current collector was coated with the negative electrode slurry, dried, and then roll-pressed to prepare a negative electrode.

After the above-prepared positive electrode and negative electrode were stacked with a polyethylene separator to prepare an electrode assembly, the electrode assembly was put in a battery case, and an electrolyte solution, in which 1 M $LiPF_6$ was dissolved in a solvent in which ethylene carbonate, ethylmethyl carbonate, and diethyl carbonate were mixed in a ratio of 1:1:1, was injected thereinto to prepare a lithium secondary battery.

Example 2

A positive electrode and a lithium secondary battery including the same were prepared in the same manner as in Example 1 except that 70 parts by weight of a polyethylene resin dispersion as a volume expansion resin, and 17 parts by weight of a $LiFePO_4$ positive electrode active material were used to prepare a first positive electrode active material slurry.

Comparative Example 1

A lithium secondary battery was prepared in the same manner as in Example 1 except that a positive electrode having a single positive electrode active material layer, which was prepared by coating a 20 μm thick Al-foil current collector with the second positive electrode active material slurry prepared in Example 1, drying, and then roll-pressing the coated Al foil, was used.

Comparative Example 2

87 parts by weight of a polyethylene resin dispersion, 10 parts by weight of carbon black as a conductive agent, and 3 parts by weight of carboxymethyl cellulose were mixed in distilled water to prepare a slurry. A positive electrode and a lithium secondary battery were prepared in the same manner as in Example 1 except that the above-prepared slurry was used instead of the first positive electrode active material slurry used in Example 1.

Comparative Example 3

87 parts by weight of a $LiFePO_4$ positive electrode active material, 10 parts by weight of carbon black as a conductive agent, and 1 part by weight of carboxymethyl cellulose (CMC) and 2 parts by weight of a styrene-butadiene rubber (SBR), as a binder, were mixed in distilled water to prepare a first positive electrode active material slurry.

A positive electrode and a lithium secondary battery were prepared in the same manner as in Example 1 except that the above-prepared first positive electrode active material slurry was used instead of the first positive electrode active material slurry used in Example 1.

Experimental Example 1: Overcharge Test

An overcharge test was performed by using the secondary batteries prepared in Examples 1 and 2 and Comparative Examples 1 to 3. Specifically, each of the secondary batteries was charged at 0.3 C to a full charge voltage (4.25 V) and cut-off charged at 0.05 C. Subsequently, after each secondary battery was subjected to a rest period of 3 hours to stabilize the voltage, each secondary battery was overcharged at 1 C to a voltage of 6.4 V.

In this regard, FIG. 1 is a graph illustrating results of the overcharge test of the lithium secondary batteries prepared in Examples 1 and 2 and Comparative Examples 1 to 3 of the present invention.

As illustrated in FIG. 1, with respect to the lithium secondary batteries prepared in Examples 1 and 2, it may be confirmed that the voltage was rapidly increased at 4.8 V or more, and, accordingly, it may be considered that an overcharge end voltage was quickly reached.

Particularly, with respect to Example 1, since a mixing ratio between the first positive electrode active material and the volume expansion resin, which were included in the first positive electrode active material layer, was optimized, the effect of blocking the conductive path of the conductive agent included in the first positive electrode active material layer and the synergistic effect of charge termination due to the volume change of the first positive electrode active material were maximized, and thus, it was considered that time for reaching the overcharge end voltage was further accelerated.

With respect to Comparative Example 1, since the nickel-cobalt-manganese-based positive electrode active material having a full charge voltage of 4.2 V to 4.3 V was included, the voltage was temporarily increased during overcharge at 4.8 V or more. With respect to Comparative Example 3, since the double-layer structured positive electrode active material layer was included, the voltage was continuously increased during overcharge at 4.8 V or more. However, with respect to Comparative Examples 1 and 3, since the volume expansion resin, in which volume expansion occurs at a high temperature, was not included, there was no point where electrical resistance rapidly increased, and thus, it was considered that an overcharge end voltage was not reached.

Since Examples 1 and 2 further included the LFP-based positive electrode active material, which increased the resistance at a high voltage, in the first positive electrode active material layer in comparison to Comparative Example 2, a voltage rise rate may be further increased at a high temperature during overcharge, and, accordingly, it was considered that an overcharge end voltage was reached more quickly.

The invention claimed is:

1. A positive electrode for a secondary battery, comprising: a positive electrode active material layer formed on a positive electrode collector,
   wherein the positive electrode active material layer has a double-layer structure comprising a first positive electrode active material layer formed on the positive electrode collector and a second positive electrode active material layer formed on the first positive electrode active material layer, the first positive electrode active material layer comprises a first positive electrode active material, a conductive agent, and a volume expansion resin, and the second positive electrode active material layer comprises a second positive electrode active material, wherein the volume expansion resin is configured to expand during overcharge, wherein the volume expansion resin is included in an amount of 30 wt % to 70 wt % based on the total weight of the first positive electrode active material layer, wherein the volume expansion resin is a polyethylene resin, and the first positive electrode active material is LiFePO$_4$ included in an amount of 9.9 wt % to 89.9 wt % based on the total weight of the first positive electrode active material layer.

2. The positive electrode for a secondary battery of claim 1, wherein the first positive electrode active material is a different compound than the second positive electrode active material.

3. The positive electrode for a secondary battery of claim 1, wherein the the second positive electrode active material is a compound represented by Formula 2:

[Formula 2]

wherein, in Formula 2,

M' is at least one element selected from the group consisting of Mn, Al, Ti, Ga, Cu, V, Nb, Zr, Ce, In, Zn, and Y, and $0<a<1$, $0<b<1$, $0<c<1$, $-0.1 \leq x \leq 0.2$, and $a+b+c=1$.

4. The positive electrode for a secondary battery of claim 1, wherein an overcharge voltage is 4.5 volts or more.

5. The positive electrode for a secondary battery of claim 1, wherein the volume expansion resin is a polymer having an onset point of 60° C. to 70° C. and a melting point of 180° C. or less.

6. The positive electrode for a secondary battery of claim 1, wherein the first positive electrode active material layer has a thickness of 30 μm or less.

7. A lithium secondary battery comprising the positive electrode of claim 1, a negative electrode, and a separator disposed between the positive electrode and the negative electrode.

* * * * *